(12) United States Patent
Yamasaki

(10) Patent No.: US 11,162,974 B2
(45) Date of Patent: Nov. 2, 2021

(54) SCANNING PROBE MICROSCOPE AND OPTICAL AXIS ADJUSTMENT METHOD IN SCANNING PROBE MICROSCOPE

(71) Applicant: Shimadzu Corporation, Kyoto (JP)

(72) Inventor: Kenji Yamasaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/133,895

(22) Filed: Dec. 24, 2020

(65) Prior Publication Data

US 2021/0302465 A1 Sep. 30, 2021

(30) Foreign Application Priority Data

Mar. 30, 2020 (JP) .............................. JP2020-060847

(51) Int. Cl.
*G01Q 10/04* (2010.01)
*G01Q 60/22* (2010.01)

(52) U.S. Cl.
CPC ............. *G01Q 10/04* (2013.01); *G01Q 60/22* (2013.01)

(58) Field of Classification Search
CPC ................................ G01Q 10/04; G01Q 60/22
USPC .................. 850/1, 2, 3, 4, 5, 6, 7, 8
See application file for complete search history.

(56) References Cited

U.S. PATENT DOCUMENTS

| 8,887,311 | B1* | 11/2014 | Kirishima | G01Q 20/02 |
| | | | | 850/5 |
| 2007/0180889 | A1* | 8/2007 | Murayama | G01Q 10/06 |
| | | | | 73/1.79 |
| 2014/0096293 | A1* | 4/2014 | Kitano | B82Y 35/00 |
| | | | | 850/32 |
| 2017/0059609 | A1* | 3/2017 | Watanabe | G01Q 20/02 |
| 2018/0259552 | A1* | 9/2018 | Kobayashi | G01Q 20/02 |

FOREIGN PATENT DOCUMENTS

JP 6627953 B1 1/2020

* cited by examiner

*Primary Examiner* — Nicole M Ippolito
(74) *Attorney, Agent, or Firm* — Muir Patent Law, PLLC

(57) ABSTRACT

Diffused reflection of a laser beam is prevented from adversely affecting the processing of an optical axis adjustment of the laser beam in a scanning probe microscope. In a case where a position of a spot of a laser beam identified based on an image captured by an imaging unit is moved in a direction predicted when the laser beam is moved, a control device of the scanning probe microscope sets a position of the identified spot as an initial position. The control device identifies the position that diffusely reflects the laser beam based on the image captured by the imaging unit and moves the spot from the initial position to the tip of the cantilever by avoiding the position that diffusely reflects the laser beam.

10 Claims, 10 Drawing Sheets

SCANNING PROBE MICROSCOPE AND OPTICAL AXIS ADJUSTMENT METHOD IN SCANNING PROBE MICROSCOPE

CROSS-REFERENCE TO RELATED APPLICATIONS

This application claims priority under 35 U.S.C. § 119 to Japanese Patent Application No. 2020-060847 filed on Mar. 30, 2020, the entire disclosure of which is incorporated herein by reference in its entirety.

TECHNICAL FIELD

The present invention relates to a scanning probe microscope and an optical axis adjustment method in a scanning probe microscope.

BACKGROUND ART

In a scanning probe microscope, a cantilever beam called "cantilever" with a probe is used. In a scanning probe microscope, the deflection or the change in the oscillation of the cantilever is converted into a change in the reflected light of the laser beam irradiated on the back surface of the cantilever and detected by a photodetector. The photodetector detects the changes in the position, intensity, and phase, etc., of the reflected light. A scanning probe microscope converts the information detected by the photodetector into various physical information.

In a scanning probe microscope, an optical axis adjustment of a laser beam is required to ensure that the laser beam is correctly emitted to the back of the cantilever prior to a measurement of a sample. The optical axis adjustment of the laser beam is required every time the cantilever is replaced, so it is desirable to complete the adjustment in a short time. Since the optical axis adjustment of the laser beam is required every time the cantilever is replaced, so it is desirable that it be performed automatically.

For example, Patent Document 1 (Japanese Patent No. 6627953) discloses a scanning probe microscope equipped with an image processing unit that identifies the position of the spot of the laser beam and the position of the cantilever based on an image. The scanning probe microscope disclosed in Patent Document 1 is further provided with an optical axis adjustment unit that adjusts the position of the laser light source based on the identified position of the spot of the laser beam and the position of the tip of the cantilever.

PRIOR ART DOCUMENT

Patent Document

Patent Document 1: Japanese Patent No. 6,627,953

SUMMARY OF THE INVENTION

Problems to be Solved by the Invention

However, a spot diameter of a laser beam in a scanning probe microscope is in nanometer (nm) unit to micrometer (μm) unit. Therefore, there is a possibility that the laser beam is diffusely reflected due to the influence of scratches formed on the irradiation surface irradiated with the laser beam, dust adhering to the irradiation surface, or dust floating in the imaging range. The scanning probe microscope disclosed in Patent Document 1 failed to consider the diffused reflection of the laser beam.

The present invention has been made to solve such a problem. An object of the present invention is to prevent diffused reflection of a laser beam from adversely affecting the processing of an optical axis adjustment of the laser beam in a scanning probe microscope.

Means for Solving the Problem

A scanning probe microscope according to one aspect of the present invention includes:
a cantilever;
a light source configured to emit a laser beam toward the cantilever;
a moving mechanism configured to relatively move an irradiation position of the laser beam on an irradiation surface of the laser beam with respect to the irradiation surface;
an imaging unit with an imaging range in which the cantilever is imaged; and
a control device,
wherein the control device is configured to:
identify a position that diffusely reflects the laser beam, based on an image captured by the imaging unit; and
relatively move the irradiation position with respect to the irradiation surface by the moving mechanism so that the laser beam is emitted to the cantilever by avoiding the position that diffusely reflects the laser beam.

A scanning probe microscope according to another aspect of the present invention includes:
a cantilever;
a light source configured to emit a laser beam toward the cantilever;
a moving mechanism configured to relatively move an irradiation position of the laser beam on an irradiation surface of the laser beam with respect to the irradiation surface;
an imaging unit with an imaging range in which the cantilever is imaged; and
a control device,
wherein the control device is configured to:
identify a position of a spot of the laser beam formed on the irradiation surface, based on an image captured by the imaging unit; and
identify the irradiation position depending on whether or not the position of the spot identified based on an image captured by moving the irradiation position by the moving mechanism is a position predicted by a movement of the irradiation position.

Effects of the Invention

It is possible to prevent diffused reflection of a laser beam from adversely affecting an optical axis adjustment of a laser beam in a scanning probe microscope.

BRIEF DESCRIPTION OF THE DRAWINGS

FIG. 4 is an example of an image P captured when a laser beam LA is diffusely reflected by dust or the like.

EMBODIMENTS FOR CARRYING OUT THE INVENTION

Figure 1:
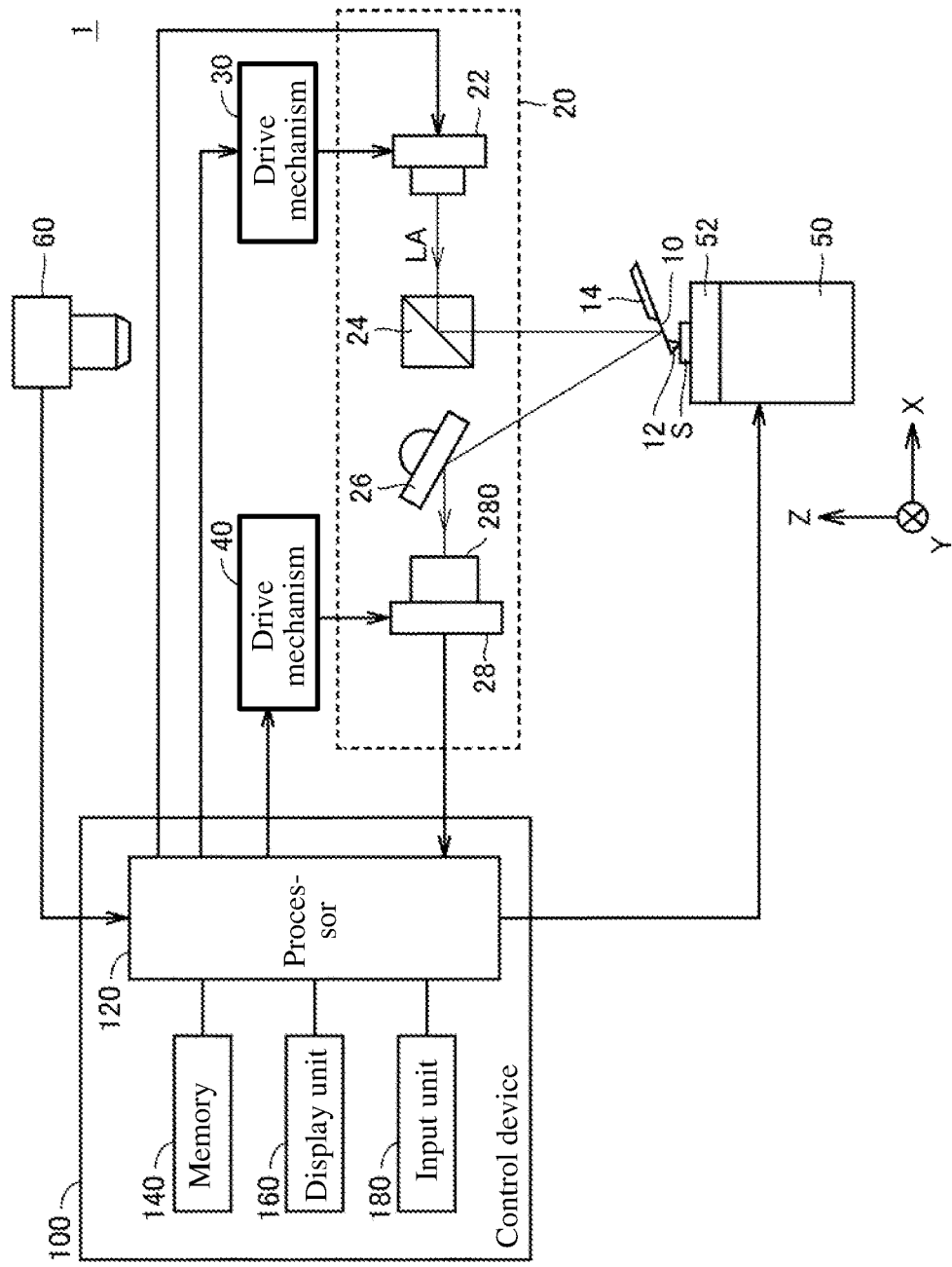
FIG. 1 is a diagram schematically showing a configuration of a scanning probe microscope 1 according to an embodiment.

Hereinafter, some embodiments of the present invention will be described in detail with reference to the attached drawings. In the following descriptions, the same or corresponding portions in the drawings will be allotted by the same reference numerals, and the explanation thereof will not be repeated basically.

[Configuration of Scanning Probe Microscope 1]

FIG. 1 is a diagram schematically showing a configuration of a scanning probe microscope 1 according to an embodiment. In the following descriptions, the ground plane of the scanning probe microscope 1 is denoted as an X-Y plane, and an axis perpendicular to the X-Y plane is denoted as a Z-axis.

Referring to FIG. 1, the scanning probe microscope 1 is provided with, as main constituent components, a cantilever 10, a holder 14, an optical system 20, drive mechanisms 30 and 40, a scanner 50, a sample holder 52, an imaging unit 60, and a control device 100.

The cantilever 10 is provided so as to be positioned above the sample S placed on the sample holder 52 at the time of measurement. The cantilever 10 is supported by the holder 14 so as to vibrate vertically and has a probe 12 on a side (tip side) that is not supported by the holder 14.

The optical system 20 emits, at the time of measurement, a laser beam LA to the back surface of the cantilever 10 (a surface opposite to a surface facing the sample S) and detects the laser beam LA reflected by the back surface of the cantilever 10. The control device 100 computes the deflection of the cantilever 10 based on the laser beam LA detected by the optical system 20. The optical system 20 is provided with a laser light source 22, a beam splitter 24, a reflector 26, and a detector 28.

The laser light source 22 is constituted by a laser oscillator or the like for emitting a laser beam LA. The laser beam LA emitted from the laser light source 22 is reflected by the beam splitter 24 to be directed to the cantilever 10. The laser beam LA emitted to the cantilever 10 is reflected by the back surface of the cantilever 10, further reflected by the reflector 26, and is incident on the detector 28. The detector 28 has a light-receiving surface 280 for receiving the laser beam LA reflected by the back surface of the cantilever 10. The detector 28 detects the laser beam LA received by the light-receiving surface 280 and outputs the obtained detection result to the control device 100.

The drive mechanism 30 moves the laser light source 22 along a plane (the Y-Z plane in the drawing, in the example shown in FIG. 1) perpendicular to the optical axis of the laser beam LA emitted from the laser light source 22. The drive mechanism 30 drives a motor in accordance with the control signal from the control device 100 to move the laser light source 22 to thereby adjust the optical axis of the laser beam LA so that the laser beam LA is reflected by the cantilever 10.

The drive mechanism 40 moves the detector 28 along the plane (the Y-Z plane in the drawing, in the example shown in FIG. 1) perpendicular to the optical axis of the laser beam LA incident on the light-receiving surface 280 reflected by the reflector 26. The drive mechanism 40 drives, for example, a motor in accordance with the control signal from the control device 100 to move the detector 28 to thereby adjust the position of the detector 28 so that the laser beam LA reflected by the cantilever 10 is brought to be incident on the center of the light-receiving surface 280.

The scanner 50 is formed in a cylindrical shape. The sample S is held on top of the sample holder 52 placed on the scanner 50. The scanner 50 is provided with an X-Y scanner for scanning the sample S in the two-axis directions, i.e., the Y-axis direction and the X-axis direction orthogonal to each other and a Z scanner for finely move the sample S in the Z-axis direction perpendicular to the X-axis direction and the Y-axis direction. The X-Y scanner and the Z scanner are each driven by a driving source configured by a piezoelectric element that deforms by a voltage applied from a drive unit (not shown). The scanner 50 is driven by the X-Y scanner and the Z scanner in three-dimensional directions.

The drive unit controls the X-Y scanner and the Z scanner according to the control signal from the control device 100 to thereby change the relative positional relation between the sample S on the scanner 50 and the probe 12.

The imaging unit 60 is disposed above the probe 12 to image the cantilever 10 from above. The imaging unit 60 acquires image data by imaging a subject present in the imaging field-of-view. The imaging unit 60 includes, as main constituent elements, an optical system, such as, e.g., a lens and a diaphragm, and a light-receiving element, such as, e.g., a CCD (Charge Coupled Device) image sensor and a CMOS (Complementary Metal Oxide Semiconductor) image sensor. The imaging unit 60 outputs the acquired image data to the control device 100. The image data acquired by the imaging unit 60 is used, for example, to adjust the optical axis of the laser beam LA.

The control device 100 controls the operation of each portion constituting the scanning probe microscope 1. The control device 100 is configured in accordance with general-purpose computer architecture as an example. Note that the control device 100 may be implemented by using hardware dedicated to the scanning probe microscope 1. The control device 100 is equipped with a processor 120, a memory 140, a display unit 160, and an input unit 180.

The processor 120 is typically an arithmetic unit, such as, e.g., a CPU (Central Processing Unit) and an MPU (Multi Processing Unit). The processor 120 reads out and performs the program stored in the memory 140 to realize each of the processing of the control device 100 which will be described later. In the example of FIG. 1, the configuration in which the processor is composed of a single element is illustrated, but the control device 100 may be composed of a plurality of processors.

The memory 140 is realized by a non-volatile memory, such as, e.g., a RAM (Random Access Memory), a ROM (Read Only Memory), and a flash memory. The memory 140 stores programs to be performed by the processor 120 or data to be used by the processor 120. For example, the memory 140 stores a program for performing position adjustment processing Step S1 of the laser light source 22 and position adjustment processing Step S2 of the detector 28, which will be described later.

The memory 140 may be a CD-ROM (Compact Disc-Read Only Memory, a DVD-ROM (Digital Versatile Disk-Read Only Memory, a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (except for a memory card), an optical card, a mask ROM, or an EPROM as long as the program can be recorded non-temporarily in a computer-readable format by the control device 100 which is one type of computers.

The display unit 160 is configured by a liquid crystal display panel or the like. The display unit 160 displays, for example, measurement results obtained by measurements with the scanning probe microscope 1 or various setting screens for performing measurements by the scanning probe microscope 1.

The input unit 180 is configured by a mouse, a keyboard, and the like. The input unit 180 is an input interface for receiving information input via the input unit 180. The control device 100 may be provided with a touch panel in which the display unit 160 and the input unit 180 are integrated.

[Optical Axis Adjustment to be Performed at the Time of Starting Measurement]

In the scanning probe microscope 1, the optical system 20 is required to be adjusted such that the position (the position where the light-receiving quantity is the largest) of the laser beam LA reflected by the cantilever 10 is brought to be positioned at the center of the light-receiving surface 280 of the detector 28 in a state in which the cantilever 10 is not deflected. This optical axis adjustment is performed each time the cantilever 10 is replaced.

Figure 2:
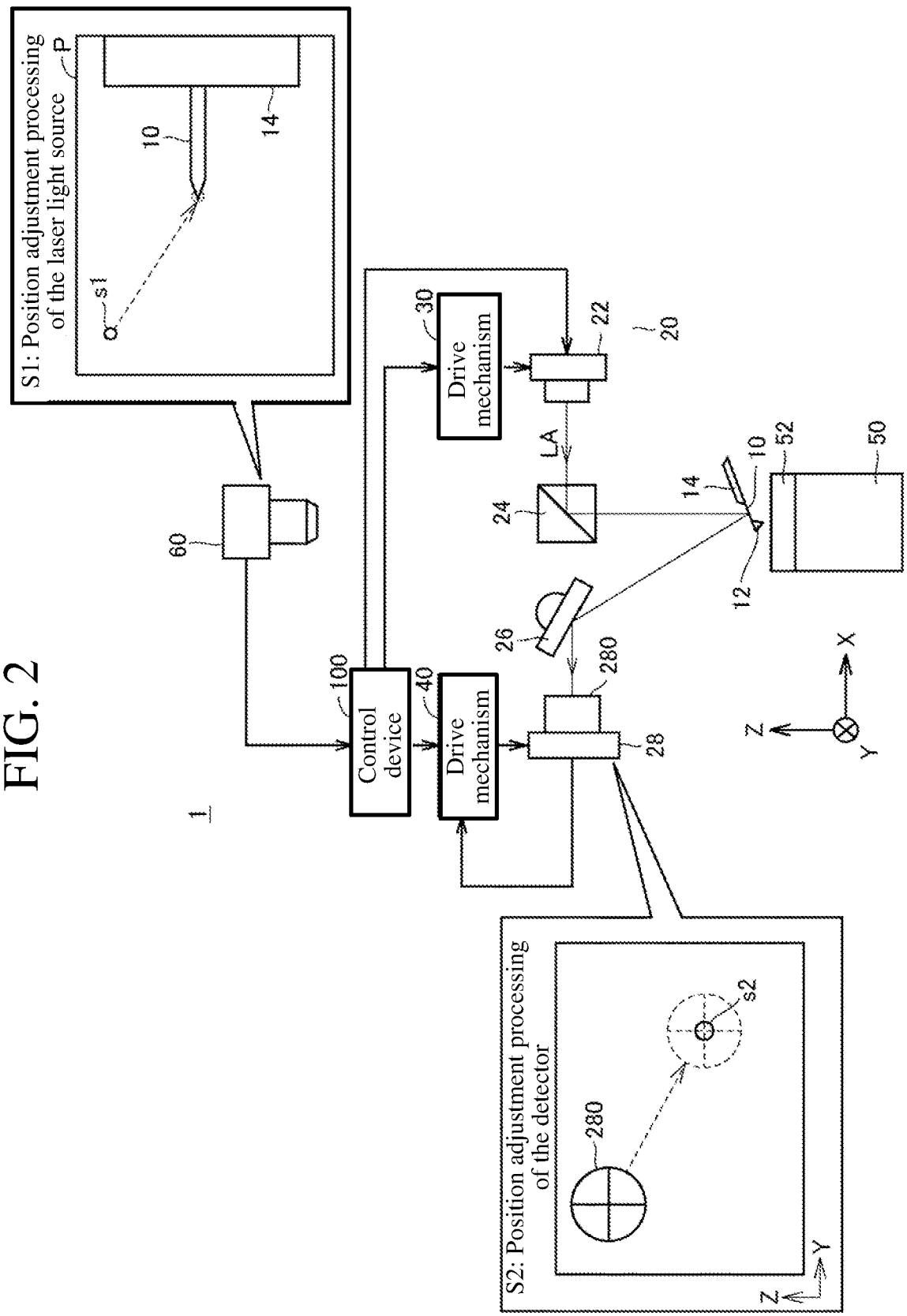
FIG. 2 is a schematic diagram for explaining an optical axis adjustment method to be performed at the time of the start of a measurement.

FIG. 2 is a schematic diagram for explaining the optical axis adjustment method to be performed at the time of a starting measurement. The processing for the optical axis adjustment includes position adjustment processing Step S1 of the laser light source 22 and position adjustment processing Step S2 of the detector 28.

The control device 100 performs the position adjustment processing Step S1 of the laser light source 22 upon receipt of an instruction to start the optical axis adjustment. In the position adjustment processing Step S1 of the laser light source 22, the control device 100 adjusts the position of the laser light source 22 so that the spot s1 formed by the laser beam LA emitted to the sample holder 52 or the cantilever 10 is brought to be positioned at the tip of the cantilever 10. The control device 100 identifies the positional relation between the spot s1 and the tip of the cantilever 10 based on the image P generated by the imaging unit 60. The control device 100 controls the drive mechanism 30 based on the identified positional relation to move the laser light source 22 in the Y-direction and the Z-direction in the drawing so that the spot s1 is brought to be positioned at the tip of the cantilever 10.

When the control device 100 determines that the spot s1 is positioned at the tip of the cantilever 10, the control device 100 performs the position adjustment processing Step S2 of the detector 28. Note that the position adjustment processing Step S2 of the detector 28 may be performed in response to receiving a starting instruction of the position adjustment processing Step S2 of the detector 28. In the position adjustment processing Step S2 of the detector 28, the control device 100 adjusts the position of the detector 28 so that the spot s2 of the laser beam LA reflected by the cantilever 10 (spot s2 formed by the light-receiving surface 280 irradiated with the laser beam LA) is brought to be positioned at the center of the light-receiving surface 280.

The position adjustment processing Step S2 of the detector 28 may be performed by the user. Specifically, the position adjustment processing Step S2 may be realized by further providing an operation unit used to drive the drive mechanism 40 for moving the detector 28 in the scanning probe microscope 1 and operating the operation unit by a user based on a detection result from the detector 28.

[Configuration of Sample Holder 52]

In this embodiment, the sample holder 52 is provided with a mirror 522 in order to easily detect the spot s1 by the imaging unit 60, the spot s1 being formed on the irradiation surface by the laser beam LA incident on the irradiation surface.

Figure 3:
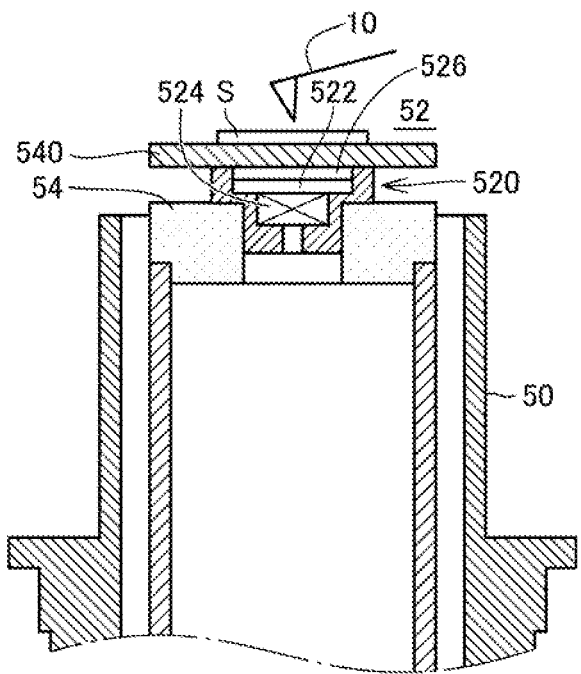
FIG. 3 is a longitudinal cross-sectional view of an upper portion of a scanner 50 and a sample holder 52 when observing a sample S.

FIG. 3 is a longitudinal cross-sectional view of the upper portion of the scanner 50 and the sample holder 52 when observing the sample S. Referring to FIG. 3, at the upper end surface of the scanner 50, a substantially doughnut-shaped pedestal 54 having a cylindrical bore in the center is provided.

The sample holder 52 includes a stub-type attachment 520 and a sample stage 540. The stub-type attachment 520 is formed in a convex shape in the lower portion. The stub-type attachment 520 is fixed to the scanner 50 by inserting the convex portion into the cylindrical bore provided in the center of the pedestal 54. Note that the stub-type attachment 520 may be fixed to the scanner 50 by screws or the like.

On the upper surface of the stub-type attachment 520, a recess 526 is formed. A mirror 522 is provided in the recess 526. Inside the stub-type attachment 520, a magnet 524 is embedded. The stub-type attachment 520 is made of aluminum.

The sample stage 540 is a base for placing a sample S thereon and is made of a metallic material. When observing a sample, the sample stage 540 is placed above the mirror 522. On the other hand, during the optical axis adjustment described with reference to FIG. 2, the sample stage 540 is not placed above the mirror 522.

When the sample stage 540 is placed above the mirror 522, the sample stage 540 is secured to the stub-type attachment 520 by the attractive force of the magnet 524 in the stub-type attachment 520. Also, since the mirror 522 is arranged inside the recess 526, a gap is formed between the mirror 522 and the sample stage 540 when the sample stage 540 is positioned above the mirror 522.

The optical axis adjustment described with reference to FIG. 2 is performed with the sample stage 540 not placed above the mirror 522. Therefore, the laser beam LA is not blocked by the sample stage 540 and is incident on the mirror 522. The laser beam LA reflected by the mirror 522 is not blocked by the sample stage 540 and is incident on the imaging unit 60.

In the following, it will be described that the optical axis adjustment described with reference to FIG. 2 is performed without placing the sample stage 540 above the mirror 522.

Note that the optical axis adjustment may be performed with the sample stage 540 placed above the mirror 522. In the case of performing the optical axis adjustment with the sample stage 540 placed above the mirror 522, the optical axis adjustment may be performed with the highly reflective sample S placed on the sample stage 540.

That is, in the case of performing the optical axis adjustment in a state in which a sample S is not placed and the sample stage 540 is placed, the surface on which the sample S is placed corresponds to the "irradiation surface." In the case of performing the optical axis adjustment with a highly reflective sample S placed on the sample stage 540, the surface of the sample S corresponds to the "irradiation surface." In the case of performing the optical axis adjustment without placing the sample stage 540 above the mirror 522, the mirror surface of the mirror 522 corresponds to the "irradiation surface."

[Problems Caused when Identifying Irradiation Position of Laser Beam LA]

The control device 100 identifies, based on the image acquired by the imaging unit 60, the position of the spot s1 formed by the laser beam LA emitted to the irradiation surface. The control device 100 performs feedback control to adjust the irradiation position of the laser beam LA to coincide with the cantilever 10 as the irradiation position of the laser beam LA.

The spot diameter of the laser beam LA in the scanning probe microscope 1 is in nanometer (nm) unit to micrometer (μm) unit. Therefore, the laser beam LA may be diffusely reflected due to the influence of scratches formed on the irradiation surface of the laser beam, dust adhering to the irradiation surface, dust or the like floating within the imaging range, or the like. Note that the substance adhering to the irradiation surface that causes the diffuse reflectance includes, but is not limited to, a solution scattered when observed in the liquid and dust.

Further, the imaging range of the imaging unit 60 used to identify the irradiation position of the laser beam LA is a field of view in micrometer (μm) unit to millimeter (mm) unit. To identify the irradiation position of the laser beam LA, the precision in nanometer (nm) unit to micrometer (μm) unit is required. Since the imaging range of the imaging unit 60 is in micrometer (μm) unit to millimeter (mm) unit, when the laser beam LA is diffusely reflected, there is a possibility that the irradiation position (the position of the spot s1) of the laser beam LA cannot be accurately identified.

Figure 4:
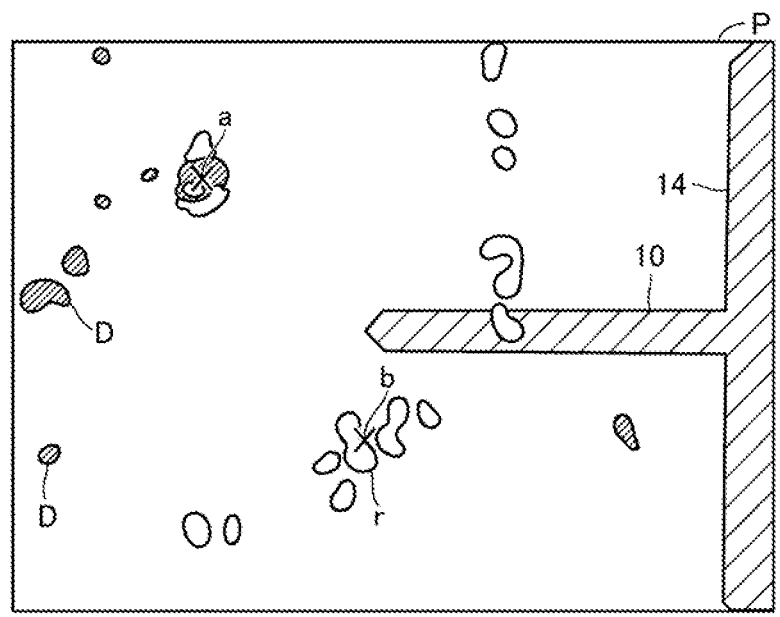

More specifically, referring to FIG. 4, it will be described that there is a possibility that the irradiation position of the laser beam LA cannot be identified since the laser beam LA is diffusely reflected. FIG. 4 is an example of the image P acquired when the laser beam LA is emitted to and diffusely reflected by dust or the like. The area shown by diagonal lines in FIG. 4 is an area D showing a portion where the laser beam LA is diffusely reflected. The area shown as white is a shadow r (the area high in brightness) of the laser beam LA reflected by the irradiation surface (mirror 522). In FIG. 4, some reference numerals are omitted.

As shown in FIG. 4, when the laser beam LA is diffusely reflected, the reflected light of the laser beam LA is incident on the imaging unit 60 from various directions. Thus, a plurality of shadows r of the laser beam LA is reflected on the image P. Further, due to the diffused reflection of the laser beam LA, there is a case in which the spot s1 of the laser beam LA is not formed. There is a possibility that the control device 100 incorrectly identifies the shadow r appeared due to the diffused diffraction of the laser beam LA as a spot s1, resulting in the incorrect identification of the irradiation position of the laser beam LA.

For example, in a case where the irradiation position of the laser beam LA on the camera-coordinate is a position a in FIG. 4, the spot s1 is formed at the position b in FIG. 4. Therefore, the control device 100 may accidentally identify the position b as the irradiation position of the laser beam LA. That is, as a problem caused by the diffused reflection of the laser beam LA, there is a problem that the irradiation position of the laser beam LA cannot be accurately identified.

The control device 100 starts the optical axis adjustment in a state in which the irradiation position of the laser beam LA is unknown. Therefore, there is a problem that the initial position of the irradiation position of the laser beam LA cannot be accurately identified because the irradiation position of the laser beam LA cannot be accurately identified.

When the initial position of the irradiation position identified based on the image P at the time of the optical axis adjustment is wrong, the control device 100 will adjust the irradiation position of the laser beam LA based on the wrong position. Consequently, there arises a problem that it requires time to adjust the irradiation position to coincide with the cantilever 10 or the irradiation position of the laser beam LA cannot be adjusted to coincide with the cantilever 10.

Further, when adjusting the irradiation position of the laser beam LA to coincide with the cantilever 10, it is required to perform the adjustment in nanometer (nm) unit to micrometer (μm) unit. However, when moving the position of the laser light source 22 by driving a motor such as the drive mechanism 30, it is difficult to move the irradiation position of the laser beam LA in nanometer (nm) unit to micrometer (μm) unit. Therefore, the control device 100 generally adjusts the irradiation position of the laser beam LA by performing feedback control based on the image captured by the imaging unit 60.

To achieve the feedback control, the control device 100 needs to identify the irradiation position of the laser beam LA by identifying the spot s1 based on the image captured by the imaging unit 60. However, as described above, when the laser beam LA is diffusely reflected, the control device 100 may not be able to accurately identify the irradiation position of the laser beam LA. Therefore, even if it is possible to accurately identify the initial position of the laser beam LA, diffused reflection of the laser beam LA occurs as the irradiation position of the laser beam LA is moved, preventing the accurate identification of the irradiation position, which results in a failure of the accurate feedback control. That is, as one problem caused by the diffused reflection of the laser beam LA, there is a problem that the accurate feedback control cannot be performed.

That is, the occurrence of the diffused reflection of the laser beam LA causes such a problem that the irradiation position of the laser beam LA cannot be accurately identified, the initial position of the irradiation position cannot be accurately identified, or the accurate feedback control cannot be performed. This adversely affects the processing of the optical axis adjustment of the laser beam LA.

[Position Adjustment Processing Step S1 of Laser Light Source 22]

Figure 5:
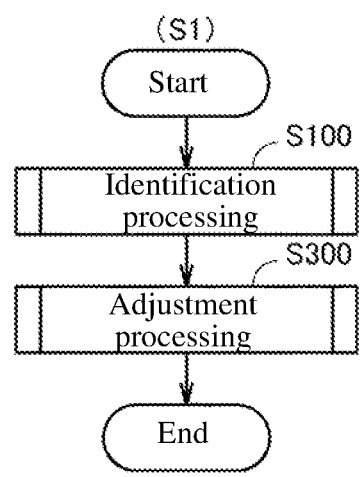
FIG. 5 is a diagram for schematically explaining position adjustment processing Step S1 of the laser light source 22 performed by a control device 100.

FIG. 5 is a diagram for schematically explaining the position adjustment processing Step S1 of the laser light source 22 performed by the control device 100. In this embodiment, the control device 100 identifies the spot s1 of the laser light source 22 based on the image generated by the imaging unit 60 and adjusts the position of the laser beam LA by controlling the drive mechanism 30 so that the irradiation position is positioned at the tip of the cantilever 10.

In order to solve the problem that the initial position of the laser beam LA cannot be accurately identified, the scanning probe microscope 1 of this embodiment performs the processing of identifying the initial position of the irradiation position (Identification processing Step S100). The identification processing Step S100 will be described later with reference to FIG. 6 to FIG. 10.

In order to solve the problem that the accurate feedback control cannot be performed after identifying the initial position of the irradiation position in the identification processing Step S100, the scanning probe microscope 1 according to this embodiment performs the processing (adjustment processing Step S300) for adjusting the irradiation position of the laser beam LA. The adjustment processing will be described later with reference to FIG. 11 to FIG. 13. Upon completion of the adjustment processing, the control device 100 ends the position adjustment processing Step S1 of the laser light source 22.

[Identification Processing]

Figure 6:
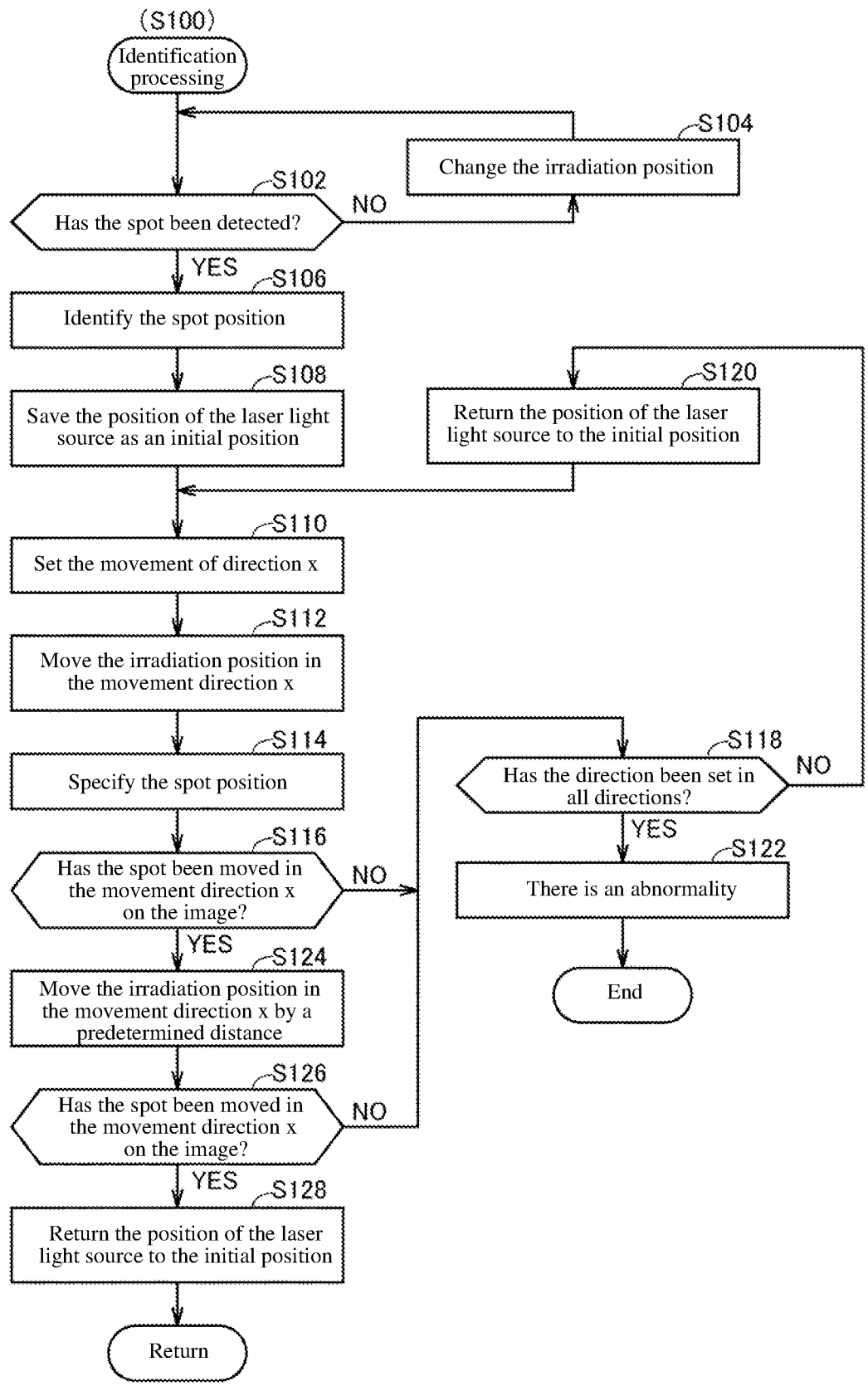
FIG. 6 is a flowchart of the identification processing Step S100.

Referring to FIG. 6, the identification processing Step S100 will be described in detail. FIG. 6 is a flowchart of the identification processing Step S100.

In Step S102, the control device 100 determines whether or not the spot s1 has been detected. More specifically, the control device 100 determines whether or not the spot s1 is formed on the irradiation surface included in the imaging range of the imaging unit 60. For example, the control device 100 determines whether or not the spot s1 is detected based on whether or not a pixel having a brightness of a predetermined threshold or more is included in the image by a predetermined number or more.

When it is determined that the spot s1 is not detected (NO in Step S102), the control device 100 changes the irradiation position in Step S104. More specifically, the control device 100 changes the irradiation position by controlling the drive mechanism 30 to move the laser light source 22.

The control device 100 repeats the processing of Steps S102 and S104 until the spot s1 is detected. When the control device 100 determines that the spot s1 has been detected (YES in Step S102), it performs the processing of Step S106.

In Step S106, the control device 100 identifies the position of the spot s1. More specifically, the control device 100 identifies the position of the spot s1 in the image (within the camera coordinate). For example, the control device 100 identifies the area that is close to a predetermined area (the number of pixels) among the area indicating a pixel having a brightness of a predetermined threshold or more and sets the position within the image of the identified area as a position of the spot s1. The predetermined area (the number of pixels) is predetermined based on, for example, the strength of the laser beam LA, the distance from the laser light source 22 to the irradiation surface, and the distance from the irradiation surface to the imaging unit 60.

In Step S108, the control device 100 saves the position of the laser light source 22 as an initial position.

In Step S110, the control device 100 sets a movement direction x. The movement direction x is a direction to move the spot s1 with respect to the irradiation surface.

In Step S112, the control device 100 moves the irradiation position in the movement direction x. More specifically, the control device 100 controls the drive mechanism 30 to move the laser light source 22 in a direction corresponding to the movement direction x to thereby move the spot s1 with respect to the irradiation surface.

In Step S114, the control device 100 identifies the position of the spot s1 based on the image captured after moving in the movement direction x.

In Step S116, the control device 100 determines whether or not the spot s1 has moved in the movement direction x on the image. More specifically, the control device 100 determines whether or not the movement direction x of the spot s1 on the image which is predicted when moving the laser light source 22 so as to move the spot s1 in the movement direction x with respect to the irradiation surface and the movement direction from the position of the spot s1 identified in Step S106 to the position of the spot identified in Step S114 coincide with each other.

When it is determined that the spot s1 has not moved in the movement direction x on the image (NO in Step S116), the control device 100 determines whether or not all of the direction settings have been performed in Step S118. More specifically, the control device 100 determines whether or not the spot s1 has been moved in all predetermined directions about the initial position.

When it is determined that all of the direction settings have not been performed (NO in Step S118), that is, when there is a movement direction x that has not been set, the control device 100 returns the position of the laser light source 22 to the initial position in Step S120 and performs the processing of Steps S110 to S116 again. In Step S110, the control device 100 sets the movement direction x to be set next based on the currently set movement direction x.

When it is determined that all of the direction settings have been performed (YES in Step S118), the control device 100 terminates the processing in Step S122 because there is an abnormality and terminates the processing. In this case, the control device 100 terminates the processing related to the optical axis adjustment.

When it is determined that the spot s1 has moved in the movement direction x on the image (YES in Step S116), the control device 100 moves the irradiation position in the movement direction x by a predetermined distance in Step S124. More specifically, the control device 100 controls the drive mechanism 30 to move the laser light source 22 to thereby move the spot s1 with respect to the irradiation surface by a predetermined distance. The movement distance is, for example, preset according to the imaging range of the imaging unit 60.

In Step S126, the control device 100 determines whether or not the spot s1 has moved in the movement direction x on the image. More specifically, the control device 100 controls the imaging unit 60 to acquire an image every predetermined time while moving by a predetermined distance and identifies the position of the spot s1 for each image acquired at each time. The control device 100 compares the position of each spot s1 identified for each image with the position of the spot identified in Step S106 to determine whether or not the spot s1 is continuously moving in the movement direction x on the image.

When it is determined that the spot s1 has not moved in the movement direction x on the image (NO in Step S126), the control device 100 performs Step S118 and subsequent processing. In other words, the control device 100 terminates the processing as there is an abnormality when all direction settings are performed and changes the direction when there is a direction that has not been set to perform Step S110 and subsequent processing.

When it is determined that the spot s1 has moved in the movement direction x on the image (YES in Step S126), the control device 100 returns the position of the laser light source 22 to the initial position in Step S128 and terminates the identification processing Step S100. Upon terminating the identification processing of Step S100, in the control device 100, the flow returns to the position adjustment processing Step S1 of the laser light source 22.

That is, the control device 100 repeats Steps S110 to S120 to sequentially change the movement direction x. Then, even if the spot s1 is moved in any movement direction x, when the movement direction of the spot s1 detected on the image does not coincide with the movement direction x of the irradiation position actually moved (YES in Step S118), the control device 100 determines that there is an abnormality and ends the processing in Step S122. Here, "there is an abnormality" in Step S122 means that the initial position of the irradiation position of the laser beam LA cannot be identified.

For example, in cases where the laser beam LA is diffusely reflected at the initial position, or in cases where the laser beam LA is diffusely reflected even if moved in any movement direction x, the control device 100 determines that there is an abnormality in Step S122.

Note that even in cases where the laser beam LA is diffusely reflected at the initial position and the position of the spot s1 identified in Step S106 differs from the irradiation position, it is conceivable that the movement direction of the position of the spot s1 detected on the image and the actually moved movement direction x coincide by chance. In this embodiment, by performing the processing of Steps S124 and S126, it is possible to determine whether or not the position of the spot s1 identified in Step S106 is correct, considering a situation that the movement direction of the position of the spot s1 detected on the image and the actually moved movement direction x coincide by chance.

It is ensured that the area D is not positioned on the trajectory of the spot s1 moved in Step S124 by performing the processing of Steps S124 and S126.

Note that the control device 100 may display information indicating that the initial position cannot be identified on the display unit 160 when the abnormality is detected. The control device 100 may display information indicating how to solve the abnormality on the display unit 160. The "method of resolving the abnormality" includes, for example, a method of manually identifying the initial position, a method of removing dust from the mirror 522, and a method of moving the mirror 522 such that the area with little scratches, dust, etc., on the mirror surface of the mirror 522 is positioned in the imaging range.

Figure 7:
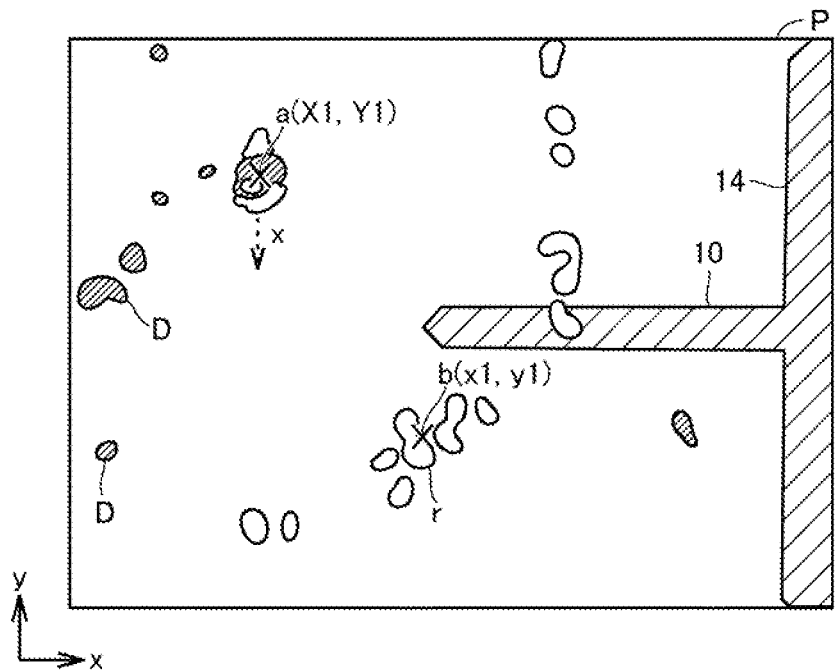
FIG. 7 is an example of an image P captured at the initial position.
Figure 8:
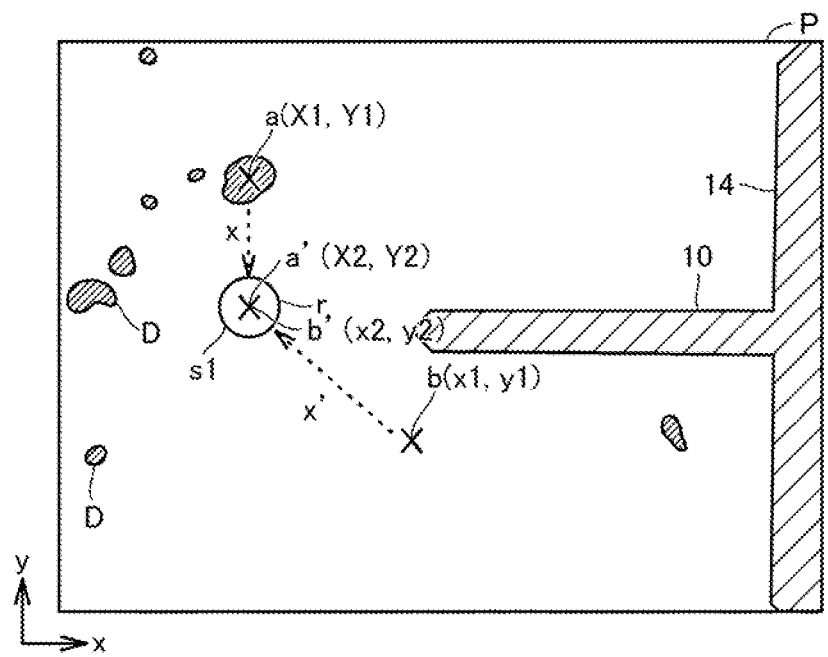
FIG. 8 is an example of an image P captured when the spot s1 is moved in the movement direction x in FIG. 7.
Figure 9:
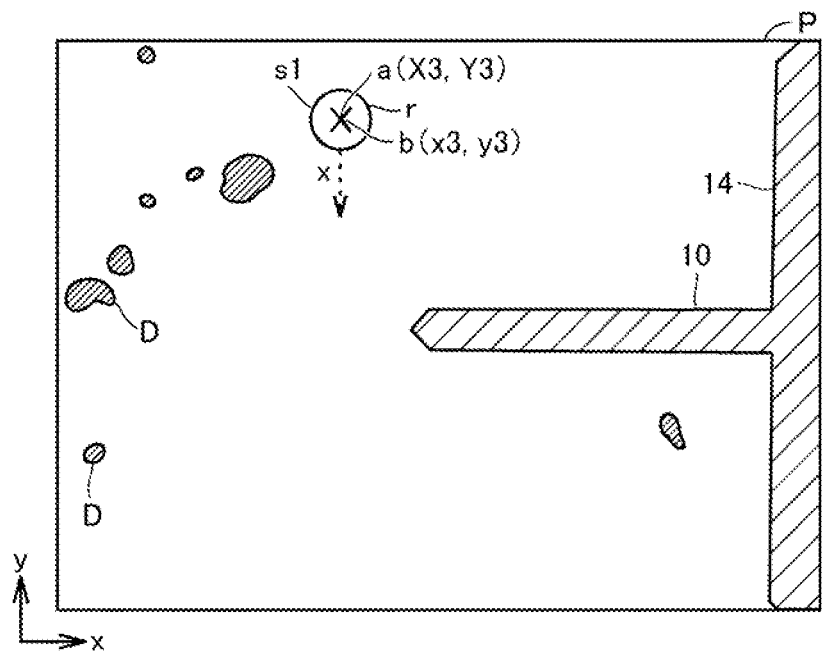
FIG. 9 is an example of an image P captured at an initial position.
Figure 10:
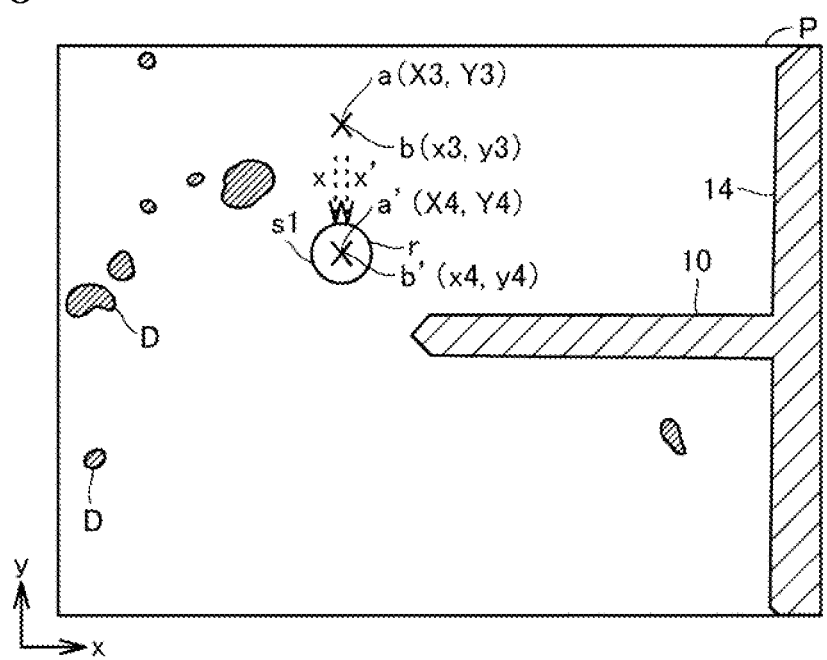
FIG. 10 shows an example of an image P captured when the spot s1 is moved in the movement direction x in FIG. 9.

Referring to FIG. 7 to FIG. 10, an example of an image captured by performing the identification processing of Step S100 will be described. FIG. 7 and FIG. 9 are an example of the image P captured at the initial position. FIG. 8 is an example of an image P captured when the spot s1 is moved in the movement direction x in FIG. 7. FIG. 10 shows an example of an image P captured when the spot s1 is moved in the movement direction x in FIG. 9. The area shown by diagonal lines in FIG. 7 to FIG. 10 is an area D showing a portion that diffusely reflects the laser beam LA. Also, the area shown as white is a shadow r (the area brighter in luminance) of the laser beam LA reflected by the irradiation surface (mirror 522). Note that in FIG. 7 to FIG. 10, some reference numerals are omitted.

The x-coordinate and the y-coordinate in FIG. 7 to FIG. 10 are camera coordinates. The X-coordinate and the Y-coordinate are coordinates based on the scanning probe microscope 1 as a reference. The position a and the position a' in FIG. 7 to FIG. 10 indicate the irradiation positions of the laser beam LA on the irradiation surface (on the XY-coordinate). The position b and the position b' indicate the camera-coordinate positions of the spot s1 identified by the control device 100 based on the image P.

In the example shown in FIG. 7, the laser beam LA is emitted to the area D that diffusely reflects the laser beam (position a (X1, Y1)). Even in this case, as shown in FIG. 7, since the laser beam LA is diffusely reflected, a plurality of shadows r of the laser beam LA is reflected on the image P. Consequently, in the example shown in FIG. 7, it is assumed that the control device 100 determines that the spot s1 is identified as being formed at the position b (x1, y1) (Step S106 in FIG. 6). That is, it is assumed that the control device 100 identifies that the initial position of the irradiation position on the camera-coordinate is at position b (x1, y1).

When the irradiation position is moved in the movement direction x in FIG. 7 (Step S112 in FIG. 6), as shown in FIG. 8, it is assumed that the irradiation position of the laser beam LA deviates from the position (area D) that causes the diffused reflection, and the spot s1 is formed on the position a' (X2, Y2) on the irradiation surface, and the formed spot s1 is projected on the image P. Then, it is assumed that the control device 100 identifies the position of the spot s1 is at the position b' (x2, y2) (Step S114 in FIG. 6). That is, it is assumed that the control device 100 has identified that the irradiation position on the camera-coordinate is at the position b' (x2, y2).

As shown in FIG. 8, the movement direction x from the position a (X1, Y1) to the position a' (X2, Y2) and the movement direction x' from the position b (x1, y1) to the position b' (x2, y2) do not coincide. In this case, the control device 100 determines that the spot s1 has not moved in the movement direction x on the image P in Step S116 shown in FIG. 6, and performs the processing of Step S118 and subsequent processing.

On the other hand, in the example shown in FIG. 9, it is assumed that the laser beam LA is not emitted to the area D that causes the diffused reflection, the spot s1 is formed at the position a (X3, Y3) which is the irradiation position, and the formed spot s1 is projected on the image P. Further, it is assumed that the control device 100 identifies that the initial position of the spot s1 is at the position b (x3, y3) (Step S106 in FIG. 6). That is, it is assumed that the control device 100 has identified that the initial position of the irradiation position on the camera-coordinate is at the position b (x3, y3).

When the irradiation position is moved in the movement direction x in FIG. 9 (Step S112 in FIG. 6), as shown in FIG. 10, it is assumed that the laser beam LA is not emitted to the area D that causes diffused reflection, the spot s1 is formed at the position a' (X4, Y4) which is the irradiation position, and the formed spot s1 is projected on the image P. Further, it is assumed that the control device 100 has identified that the position of the spot s1 is at the position b'(x4, y4) (Step S106 in FIG. 6). That is, it is assumed that the control device 100 has identified that the irradiation position on the camera-coordinate is at the position b' (x4, y4).

As shown in FIG. 10, the movement direction x from the position a (X3, Y3) to the position a' (X4, Y4) and the movement direction x' from the position b (x3, y3) to the position b' (x4, y4) coincide. In this case, the control device 100 determines that the spot s1 has moved in the movement direction x on the image P in Step S116 shown in FIG. 6, and performs Step S124 and subsequent processing.

As shown in FIG. 7 and FIG. 8, when the position of the identified spot s1 has not moved in the direction of that the irradiation position has been moved before and after the movement, it is likely that the laser beam LA is diffusely reflected at least before or after the movement. Further, it is likely that the irradiation position of the laser beam LA on the identified image P is incorrect.

On the other hand, as shown in FIG. 9 and FIG. 10, when the position of the identified spot s1 has moved in the direction that the irradiation position has been moved before and after the movement, it is likely that the laser beam LA is not diffusely reflected either before or after the movement. Further, the irradiation position of the laser beam LA on the identified image P is likely to be correct.

That is, in this embodiment, the control device 100 identifies the position of the spot s1 of the laser beam LA formed on the irradiation surface based on the image P captured by the imaging unit 60. Then, the control device 100 changes the irradiation position of the laser beam LA by moving the position of the laser light source 22 by controlling the drive mechanism 30, and identifies the irradiation position depending on whether or not the position of the spot s1 identified based on the image P captured by changing the irradiation position is the position predicted by the change of the irradiation position.

More specifically, the control device 100 moves the irradiation position in the movement direction x, and determines that the position of the identified spot s1 does not correspond to the irradiation position when the position of the spot s1 identified based on the image before the movement has not moved in the movement direction x.

Further, in the above-described embodiment, even in cases where the irradiation position is moved in the movement direction x and the position of the spot s1 identified based on the image before the movement is moved in the movement direction x, the control device 100 moves the irradiation position in the movement direction x by a predetermined distance. The control device 100 determines that the position of the spot s1 identified based on the image corresponds to the irradiation position when the position of the spot s1 identified based on the image is moved in the movement direction x in accordance with the movement of the irradiation position.

Note that it may be configured such that the control device 100 moves the irradiation position in the movement direction x without performing Steps S124 and S126, and when it is determined that the position of the spot s1 identified based on the image before the movement has moved in the movement direction x (YES in Step S116), the control device 100 performs the processing of Step S128 assuming that the position of the spot s1 identified based on the image corresponds to the irradiation position.

[Adjustment Processing]

As described above, the control device 100 performs the feedback control based on the image captured by the imaging unit 60 to adjust the irradiation position of the laser beam LA. However, when the laser beam LA is diffusely reflected, the control device 100 may not be able to identify the irradiation position of the laser beam LA accurately based on the image P. Therefore, the control device 100 according to this embodiment performs the adjustment processing Step S300 to identify the position where the laser beam LA diffusely reflects and adjust the irradiation position of the laser beam LA to the cantilever 10 so that the laser beam LA does not pass through the position that causes the diffused reflection.

Figure 11:
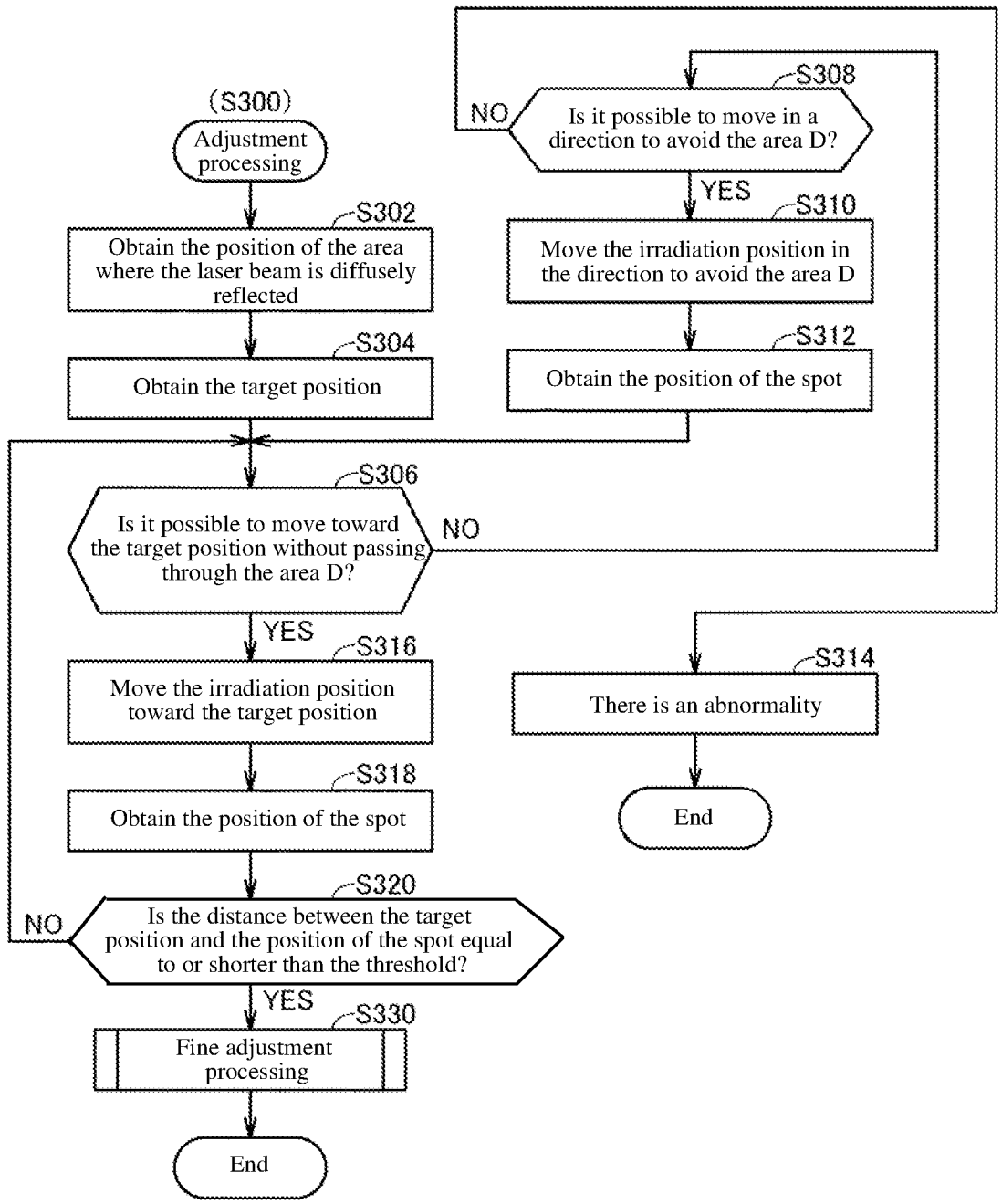
FIG. 11 is a flowchart of the adjustment processing Step S300.

Referring to FIG. 11, the adjustment processing Step S300 will be described in detail. FIG. 11 is a flowchart of the adjustment processing Step S300. The adjustment processing Step S300 shown in FIG. 11 is executed when the position of the laser light source 22 is returned to the initial position (Step S128) without terminating the processing related to the optical axis adjustment on the assumption that there is an abnormality (Step S122) in the identification processing Step S100 shown in FIG. 6, and the position adjustment processing Step S1 of the laser light source 22 is returned. That is, the adjustment processing Step S300 is performed when the control device 100 determines that the initial position has been correctly identified.

In Step S302, the control device 100 determines the position of the area D that diffusely reflects the laser beam LA. For example, the control device 100 obtains the area D that diffusely reflects the laser beam LA, based on the image captured with the laser light source 22 turned off.

As an example, the control device 100 binarizes the image P based on the pixel value. Then, the control device 100 divides the area (the area corresponding to the mirror surface of the mirror 522) except for the cantilever 10 and the holder 14 into one or a plurality of areas based on the binarized image, and integrates the pixel values in the vertical and horizontal directions (x-y direction) for each divided area. The integrated value of the area (area including the area D) where there exist scratches or a substance such as dust becomes greater than the mirror surface of the mirror 522. Therefore, the control device 100 can obtain the coordinates of the four corners of the area D on the camera-coordinate.

That is, in this embodiment, the control device 100 identifies the position of the area D that diffusely reflects the laser beam LA in the range of the area corresponding to the mirror 522 in the image. The area corresponding to the cantilever 10 and the holder 14 in the image is identified by, for example, known pattern matching or the like.

The method of determining the position of the area D on the camera coordinate is not limited to the above-described method. For example, the control device 100 may determine the position of the area D by performing pre-processing for removing noise for the image and comparing images before and after the noise removal. The filters used for the pre-processing may include an averaging filter, an expansion filter, a shrinkage filter, a median filter, etc. The control device 100 may use these filters in combination.

The control device 100 may determine the position of the area D using conventional particle analysis techniques, assuming scratches and substances (e.g., dust, solutions, etc.) are particles. The method of determining the position of the area D is not limited to the method exemplified above.

In Step S304, the control device 100 obtains the target position. The target position is, for example, the tip of the cantilever 10 that is not supported by the holder 14. In Step S304, the spot s1 is located at the initial position of the spot s1 identified in Step S106.

In Step S306, the control device 100 determines whether or not the spot can be moved toward the target position without passing through the area D. More specifically, the control device 100 determines whether or not the area D exists in the movement direction from the spot s1 to the target position. When the distance between the spot s1 and the area D is sufficiently large, it may be determined that the spot can be moved toward the target position without passing through the area D.

When it is determined that the spot cannot be moved toward the target position (NO in Step S306), the control device 100 determines in Step S308 whether or not the spot can be moved in a direction that avoids the area D. For example, the control device 100 determines whether or not the spot s1 can be moved to avoid the area D within the imaging field-of-view of the imaging unit 60.

When the control device 100 determines that the spot s1 cannot be moved in a direction that avoids the area D (NO in Step S308), it determines that there is an abnormality in Step S314, and ends the processing. In this case, the control device 100 ends the processing related to the optical axis adjustment. At this time, the control device 100 may make the display unit 160 display the information indicating that the position adjustment processing Step S1 of the laser light source 22 could not be successfully terminated.

When the control device 100 determines that the spot s1 can be moved in a direction that avoids the area D (YES in Step S308), the control device 100 moves the irradiation position in Step S310 in the direction that avoids the area D. Note that when there is a plurality of directions that avoid the area D, the control device 100 may select a direction closer to the target position.

The control device 100 moves the drive mechanism 30 by a pulse predetermined in Step S310 and then determines the position of the spot s1 in Step S312. After determining the position of the spot s1, the control device 100 performs Step S306 again to determine whether or not the spot s1 can be moved toward the target position without passing through the area D.

The control device 100 repeats processing of Steps S308 to S312 until it determines that the spot s1 can be move toward the target position without passing through the area D. That is, by repeating the processing of Steps S308 to S312, the control device 100 can move the irradiation position of the laser beam LA so as not to pass through the position that causes the diffused reflection.

When the control device 100 determines that the spot can be moved toward the target position without passing through area D (YES in Step S306), it moves the irradiation position toward the target position in Step S316.

The control device 100 drives the drive mechanism 30 by a predetermined pulse in Step S316 and then determines the position of the spot s1 in Step S318.

In Step S320, the control device 100 determines whether or not the distance between the target position and the position of the spot s1 is equal to or less than a predetermined threshold.

When the control device 100 determines that the distance between the position of the target position and the position of the spot s1 is longer than the predetermined threshold (NO in Step S320), the control device 100 performs the processing of Step S306 and subsequent processing to reduce the distance between the position of the target position and the position of the spot s1.

The control device 100 repeats the processing of Steps S306 to S318 until it determines that the distance between the target position and the position of the spot s1 is equal to or less than the predetermined threshold. When the control device 100 determines that the distance between the target position and the position of the spot s1 is equal to or less than the predetermined threshold (YES in Step S320), the control device 100 performs fine adjustment processing Step S330, then ends the adjustment processing Step S300, returns to the position adjustment processing Step S1 of the laser light source 22, ends the position adjustment processing Step S1 of the laser light source 22, and performs the position adjustment processing Step S2 of the detector 28.

[Fine Adjustment Processing]

Figure 12:
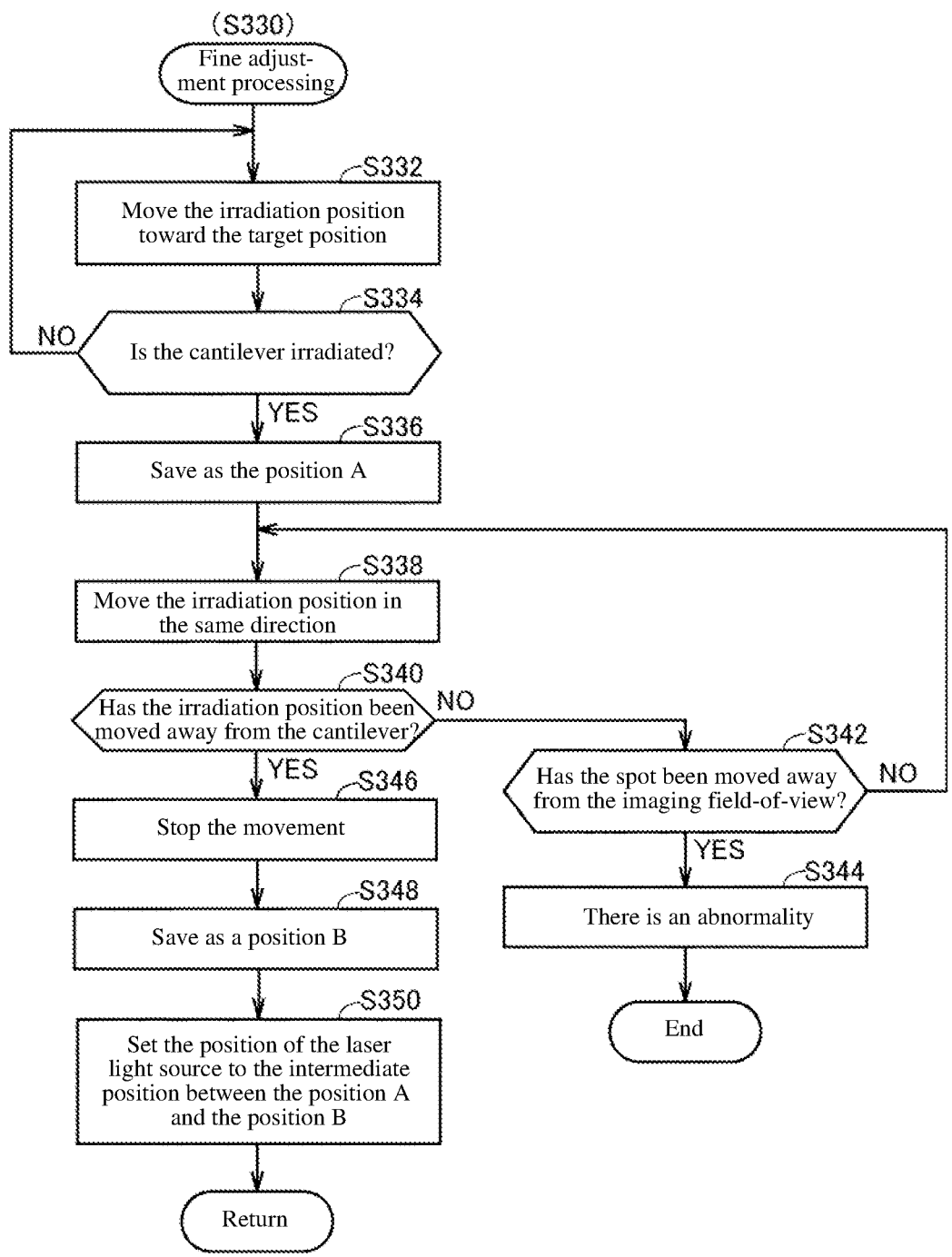
FIG. 12 is a flowchart of the fine adjustment processing Step S330.

Referring to FIG. 12, the fine adjustment processing Step S330 will be described in detail. FIG. 12 is a flowchart of the fine adjustment processing Step S330. The fine adjustment processing Step S330 shown in FIG. 12 is processing to be performed at the timing when the distance between the target position and the position of the spot s1 has become shorter than the predetermined threshold, and is processing for adjusting the irradiation position so as to be on the tip of the cantilever 10.

In Step S332, the control device 100 moves the irradiation position toward the target position. The control device 100 continuously moves the irradiation position toward the target position until the control device determines that the laser beam LA is emitted to the cantilever 10 (YES in Step S334).

Whether or not the laser beam LA is emitted to the cantilever 10 is determined based on, for example, whether or not the spot s1 has been determined. While the laser beam LA is being emitted to the mirror surface of the mirror 522, the control device 100 can identify the spot s1. On the other hand, when the surface of the cantilever 10 has the property of diffusely reflecting the laser beam LA, the control device 100 has become unable to identify the spot s1 at the timing at which the laser beam LA is emitted onto the cantilever 10. Therefore, the control device 100 may determine that the laser beam LA is being emitted to the cantilever 10 by the fact that it has become impossible to identify the spot s1, When the control device 100 determines that the laser beam LA is being emitted to the cantilever 10 (YES in Step S334), the control device 100 stores the position of the laser light source 22 at the timing at which it is determined that the laser beam LA is emitted to the cantilever 10 as the position A.

In Step S336, the control device 100 moves the irradiation position in the same direction. The same direction means the same direction as the movement direction in Step S332.

The control device 100 drives the drive mechanism 30 by the predetermined pulse in Step S336 and then, in Step S340, the control device 100 determines whether or not the laser beam LA has deviated from the cantilever 10. Whether or not the laser beam LA has deviated from the cantilever 10 is determined based on whether or not the spot s1 is detected in the same manner as in Step S334. The control device 100 may determine that the laser beam LA has deviated from the cantilever 10 by the fact that the spot s1 could be identified.

When the control device 100 determines that the laser beam LA has not deviated from the cantilever 10 (NO in Step S342), the control device 100 determines in S342 whether or not the spot s1 has deviated from the imaging field-of-view.

When the control device 100 determines that the spot s1 has deviated from the imaging field-of-view (YES in Step S342), the control device 100 determines in Step S344 that there is an abnormality and ends the processing. In this case, the control device 100 ends the processing related to the optical axis adjustment. At this time, the control device 100 may make the display unit 160 display the information indicating that the position adjustment processing Step S1 of the laser light source 22 could not be successfully terminated.

When the control device 100 determines that the spot s1 has not deviated from the imaging field-of-view (NO in Step S342), the control device 100 performs the processing of Step S338 and the subsequent processing again and repeats the processing of Steps S338 to S342 until the control device 100 determines that the laser beam LA has deviated from the cantilever 10 (YES in Step S340).

When the control device 100 determines that the laser beam LA has deviated from the cantilever 10 (YES in Step S340), the control device 100 stops the movement of the irradiation position in Step S346.

In Step S348, the control device 100 saves the position of the laser light source 22 when stopped as a position B.

In Step S350, the control device 100 sets the position of the laser light source 22 to an intermediate position between the position A and the position B, ends the fine adjustment processing Step S330 and returns to the adjustment processing Step S300.

That is, in this embodiment, the control device 100 identifies the position of the area D that diffusely reflects the laser beam LA based on the image captured by the imaging unit 60. Then, the control device 100 moves the irradiation position of the laser light source 22 by controlling the drive mechanism 30 to move the position of the laser light source 22 so that the laser beam LA is emitted to the cantilever 10 by avoiding the position of the area D that diffusely reflects the laser beam LA.

Further, even when the control device 100 determines that the laser beam LA has emitted to the cantilever 10, the control device 100 continuously moves the irradiation position until the laser beam LA has become not emitted onto the cantilever 10. Then, the control device 100 determines the position of the laser light source 22 based on the position A of the laser light source 22 when the control device determines that the laser beam LA is emitted to the cantilever 10 and the position B of the laser light source 22 when the control device 100 determines that the laser beam LA has become no longer emitted to the cantilever 10. In other words, the control device 100 determines the state of the drive mechanism 30 at the start of the observation based on the state of the drive mechanism 30 when the control device 100 determines that the laser beam LA is emitted on the cantilever 10 and the state of the drive mechanism 30 when the control device 100 determines that the laser beam LA has become no longer emitted to the cantilever 10.

Note that the control device 100 may identify the position A of the laser light source 22 when it is determined that the laser beam LA is emitted onto the cantilever 10 as the position of the laser light source 22 at the start sof the observation.

[Path Along which the Spot s1 Follows by Performing Adjustment Processing Step S300]

Figure 13:
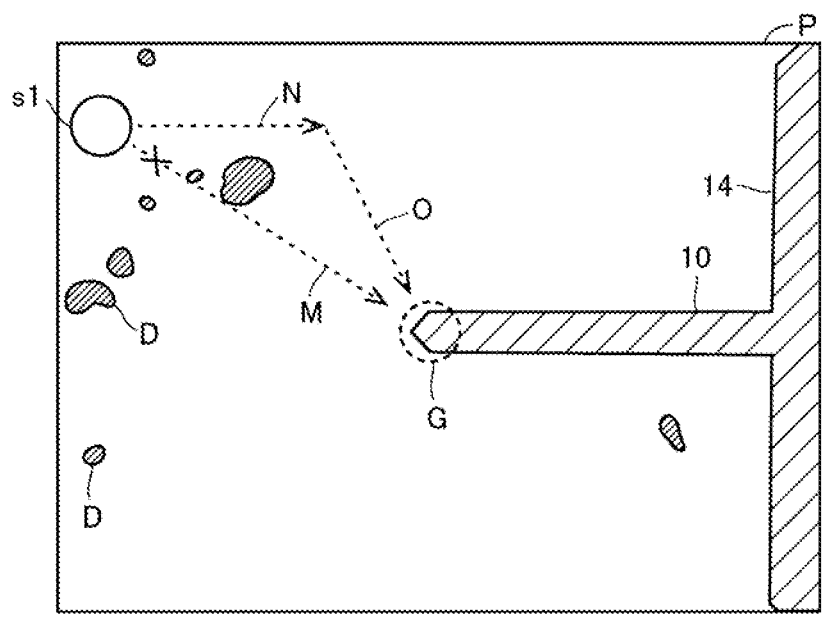
FIG. 13 is a diagram showing an example of a path along which the spot s1 follows by performing the adjustment processing Step S300.

Referring to FIG. 13, an example of the path along which the spot s1 (irradiation position) follows by performing the adjustment processing Step S300 will be described. FIG. 13 is a diagram illustrating an example of a path along which the spot s1 follows by performing the adjustment processing Step S300.

For example, in the example shown in FIG. 13, since an area D is positioned in the direction M along which the spot s1 is moved toward the target position G, the control device 100 controls the drive mechanism 30 so that the spot s1 moves along the direction N so as to avoid the area D (Steps S308 and S310 in FIG. 11).

When the control device 100 continuously performs the control of the drive mechanism 30 so that the spot s1 moves along the direction N (Steps S306 to S312 in FIG. 11), the spot s1 is positioned at a position where the spot s1 does not pass through the area D even if the spot s1 is moved toward the target position G.

When the control device 100 determines that the spot s1 can be moved toward the target position G without passing through the area D (YES in S306 of FIG. 11), the control device 100 moves the spot s1, for example, along the direction θ.

As described above, by performing the adjustment processing Step S300 shown in FIG. 11, the control device 100 can adjust the irradiation position to the target position (the tip of the cantilever 10) without passing through the area D that diffusely reflects the laser beam LA.

[Modification of Identification Processing]

In the above-described embodiment, the spot s1 is moved with respect to the irradiation surface by moving the laser light source 22. Note that, however, the mirror 522, which is the irradiation surface, may be moved to identify the initial position of the laser beam LA by relatively moving the spot s1 with respect to the irradiation surface.

In this case, the control device 100 may determine that the position of the identified spot s1 is correct based on the fact that the position of the spot s1 does not change when the mirror 522, which is the irradiation surface, is moved in the identification processing Step S100.

The state in which the laser beam LA is not diffusely reflected can be approximated to a state in which the position of the spot s1 is not moved by the moving mirror 522. Therefore, the control device 100 may perform the processing of searching for the positional relation between the mirror 522 and the spot s1 such that the position of the spot s1 does not move even when the mirror 522 is moved as the identification processing Step S100.

That is, it may be configured such that the control device 100 moves the irradiation surface in a predetermined direction and when the position of the spot s1 identified based on the image before the movement is changed, the position of the identified spot s1 is determined not to correspond to the irradiation position. It may also be configured such that the control device 100 moves the irradiation surface in a predetermined direction and when the position of the identified spot s1 does not change based on the image before the movement, the control device 100 determines that the position of the identified spot s1 corresponds to the irradiation position.

Note that it may be configured such that the control device 100 moves the irradiation surface in a predetermined direction, even when the position of the spot s1 identified based on the image before the movement does not change, the control device 100 further moves the irradiation surface by a predetermined distance, and determines that the position of the spot s1 identified based on the image corresponds to the irradiation position based on the fact that the position of the spot s1 identified based on the image has not changed while moving the irradiation surface.

[Modification of Area that Laser Beam LA Avoid to Pass Through]

In the above-described embodiment, the area D indicating a portion that diffusely reflects the laser beam LA is set as an area. Note that the control device 100 may set an area wider than the area D as an area where the laser beam LA should avoid to pass through.

As described above, it is difficult to move the laser light source 22 in nanometer (nm) unit to micrometer (μm) unit when moving the position of the laser light source 22 by driving a motor such as the drive mechanism 30. Therefore, even if the laser beam LA is moved to avoid the area D, there is a possibility that the laser beam LA passes through the area D depending on the accuracy of the drive mechanism 30.

Therefore, by setting the area wider than the area D to an area where the laser beam LA should avoid passing through, even in a case where the accuracy of the drive mechanism 30 is not high, the laser beam LA can be prevented from passing through the area D.

That is, it may be configured such that the control device 100 moves the irradiation position with respect to the irradiation surface so as to pass through a position separated by a predetermined distance from the identified position in cases where the position of the area D is identified.

OTHER MODIFICATIONS (Processing Implementation Method)

In the above-described embodiment, the configuration example is described in which the processor 120 performs a program to perform the position adjustment processing Step S1 of the laser light source 22 and the position adjustment processing Step S2 of the detector 28. However, some or all of the functions provided by the processing may be implemented by using a dedicated hardware circuit (e.g., an ASIC (Application Specific Integrated Circuit), an FPGA (Field-Programmable Gate Array)), or the like.

(Modification of Drive Mechanism 30)

In the above-described embodiment, the drive mechanism 30 changes the irradiation position of the laser beam LA by moving the position of the laser light source 22. Note that the position of the beam splitter 24 may be changed to change the irradiation position of the laser beam LA. Alternatively, the position of the cantilever 10 may be moved so that the laser beam LA is emitted to the cantilever 10.

(Modification of Adjustment Processing)

In the above-described embodiment, the control device 100 performs the feedback control based on the image captured by the imaging unit 60 until the position of the spot s1 sufficiently approaches the target position. Note that it may be configured such that the control device 100 generates a path from the initial position to the target position of the spot s1 so as to avoid the area D, moves the irradiation position along the generated path, and then performs the fine adjustment processing Step S330. That is, it may be configured such that the control device 100 controls the drive mechanism 30 to move the spot s1 along the generated path until the position of the spot s1 sufficiently approaches the target position, and performs feedback control based on the image with respect to the drive mechanism 30 after sufficiently approaching the target position. By doing so, it is possible to shorten the time required for the adjustment processing.

Further, the control device 100 may differentiate the distance that the spot s1 is moved by one control until the position of the spot s1 sufficiently approaches the target position (distance to be moved in Step S316) and the distance that the spot s1 is moved by one control after the position of the spot s1 has sufficiently approached the target position (distance to be moved in Step S338).

In this case, the control device 100 may set the distance to be moved in Step S316 to be longer than the distance to be moved in Step S338. By doing so, it is possible to shorten the time required for the adjustment processing.

That is, it may be configured such that the control device 100 performs a first control in a case where the distance between the irradiation position and the cantilever is apart from each other than a predetermined distance, and performs a second control in a case where the distance between the irradiation position and the cantilever is closer than a predetermined distance. The first control may be, for example, a control to move the irradiation position along a path formed to avoid the area D, or a control to move the irradiation position to avoid the area D based on an image. The second control may be, for example, a control that moves the irradiation position based on an image.

ASPECTS

It will be understood by those skilled in the art that the plurality of exemplary embodiments described above is illustrative of the following aspects.

(Item 1)

A scanning probe microscope according to one aspect of the present invention, incudes:

a cantilever;

a light source configured to emit a laser beam toward the cantilever;

a moving mechanism configured to relatively move an irradiation position of the laser beam on an irradiation surface of the laser beam with respect to the irradiation surface;

an imaging unit with an imaging range in which the cantilever is imaged; and a control device, wherein the control device is configured to:

identify a position that diffusely reflects the laser beam, based on an image captured by the imaging unit; and relatively move the irradiation position with respect to the irradiation surface by the moving mechanism so that the laser beam is emitted to the cantilever by avoiding the position that diffusely reflects the laser beam.

According to the scanning probe microscope recited in Item 1, in order to adjust the irradiation position so as to avoid the position that diffusely reflects the laser beam, it is possible to prevent the diffused reflection of the laser beam from adversely affecting the processing of the optical axis adjustment of the laser beam in the scanning probe microscope.

(Item 2)

The scanning probe microscope as recited in the above-described Item 1, the control device may identify the position that diffusely reflects the laser beam based on an image captured in a state in which the light source is turned off.

According to the scanning probe microscope described in the above-described Item 2, since the reflected light of the laser beam is not reflected in the image, the processing of identifying the position that causes the diffused reflection of the laser beam can be simplified.

(Item 3)

The scanning probe microscope as recited in the above-described Items 1 and 2 may further include a mirror provided in a sample holder for holding a sample, wherein the control device identifies the position that diffusely reflects the laser beam within an area corresponding to the mirror in an image captured by the imaging unit.

According to the scanning probe microscope described in the above-described Item 3, the area of the object for identifying the position that diffusely reflects the laser beam is narrowed. Therefore, the processing of identifying the position that diffusely reflects the laser beam is simplified.

(Item 4)

In the scanning probe microscope as recited in any one of the above-described Items 1 to 3, the control device may be configured to:

in a case where the laser beam is emitted to the cantilever by relatively moving the irradiation position with respect to the irradiation surface, continuously move the irradiation position with respect to the irradiation surface until the laser beam has become not emitted to the cantilever; and based on a state of the moving mechanism when the laser beam is emitted to the cantilever and a state of the moving mechanism when the laser beam has become not emitted to the cantilever by continuously moving the irradiation position with respect to the irradiation surface, determine a state of the moving mechanism at a start of an observation.

According to the scanning probe microscope as described in the above-described Item 4, even in cases where the adjustment accuracy of the irradiation position by the moving mechanism is not sufficiently high, it is possible to quickly determine the condition at the start of the observation (the condition of the moving mechanism that can be emit the laser beam to the cantilever).

(Item 5)

A scanning probe microscope according to one aspect of the present invention, includes:

a cantilever;

a light source configured to emit a laser beam toward the cantilever;

a moving mechanism configured to relatively move an irradiation position of the laser beam on an irradiation surface of the laser beam with respect to the irradiation surface;

an imaging unit with an imaging range in which the cantilever is imaged; and a control device.

The control device may be configured to:

identify a position of a spot of the laser beam formed on the irradiation surface, based on an image captured by the imaging unit; and identify the irradiation position depending on whether or not the position of the spot identified based on an image captured by moving the irradiation position by the moving mechanism is a position predicted by a movement of the irradiation position.

According to the scanning probe microscope as recited in the above-described Item 5, since it is possible to identify the irradiation position of the laser beam LA considering that the laser beam is diffusely reflected, it is possible to prevent the diffused reflection of the laser beam from adversely affecting the processing of the optical axis adjustment in the scanning probe microscope.

(Item 6)

According to the scanning probe microscope as recited in the above-described Item 5, the moving mechanism may move the irradiation position by moving the light source. In this case, in a case where the control device moves the irradiation position in a predetermined direction and the position of the spot identified based on the image captured before the irradiation position is moved is not moved in the predetermined direction, the control device may determine that the identified position of the spot does not correspond to the irradiation position.

According to the scanning probe microscope described in the above-described Item 6, since it is possible to identify the irradiation position of the laser beam LA considering that the laser beam is diffusely reflected, it is possible to prevent the diffused reflection of the laser beam from adversely affecting the processing of the optical axis adjustment in the scanning probe microscope.

(Item 7)

In the scanning probe microscope as recited in the above-described Item 6, in a case where the position of the spot identified based on the image captured before the irradiation position is moved in the predetermined direction, the control device may determine that the identified position of the spot corresponds to the irradiation position.

According to the scanning probe microscope described in the above-described Item 7, since it is possible to identify the irradiation position of the laser beam LA considering that the laser beam is diffusely reflected, it is possible to prevent the diffused reflection of the laser beam from adversely affecting the processing of the optical axis adjustment in the scanning probe microscope.

(Item 8)

In the scanning probe microscope as recited in the above-described Item 6, the control device may be configured to:

in a case where the position of the spot identified based on the image captured before the irradiation position is moved is moved in the predetermined direction, move the irradiation position in the predetermined direction by a predetermined distance, and in a case where the position of the spot identified based on the image captured by the imaging unit is moved in the predetermined direction in accordance with a movement of the irradiation position, determine that the identified position of the spot corresponds to the irradiation position.

According to the scanning probe microscope described in the above-described Item 8, it is possible to prevent the irradiation position from being identified due to that the fact that the movement direction of the position of the spot detected on the image and the actual movement direction coincide by chance. Further, according to the scanning probe microscope recited in the above-described Item 8, it is ensured that the laser beam is not diffusely reflected at the predetermined distance in which the irradiation position is moved.

(Item 9)

In an optical axis adjustment method in a scanning probe microscope according to one aspect of the present invention, the scanning probe microscope includes:

a cantilever;

a light source configured to emit a laser beam toward the cantilever;

a moving mechanism configured to relatively move an irradiation position of the laser beam on an irradiation surface of the laser beam with respect to the irradiation surface; and an imaging unit with an imaging range in which the cantilever is imaged.

The optical axis adjustment method may include:

a step of identifying a position that diffusely reflects the laser beam, based on an image captured by the imaging unit; and a step for relatively moving the irradiation position with respect to the irradiation surface so that the laser beam is emitted to the cantilever by avoiding a position that diffusely reflects the laser beam.

According to the position adjusting method of the scanning probe microscope recited in the above-described Item 9, the irradiation position is adjusted so as to prevent the diffused reflection of the laser beam. Therefore, it is possible to prevent the diffused reflection of the laser beam from adversely affecting the processing of the optical axis adjustment of the laser beam in the scanning probe microscope.

(Item 10)

In an optical axis adjustment method in a scanning probe microscope according to one aspect of the present invention, the scanning probe microscope includes:

a cantilever;

a light source configured to emit a laser beam toward the cantilever;

a moving mechanism configured to relatively move an irradiation position of the laser beam on an irradiation surface of the laser beam with respect to the irradiation surface; and an imaging unit with an imaging range in which the cantilever is imaged, wherein the optical axis adjustment method includes:

a step of identifying a position of a spot of the laser beam formed on the irradiation surface based on an image captured by the imaging unit; and a step of identifying the irradiation position depending on whether or not the position of the spot identified based on the image captured by moving the irradiation position by moving the mechanism is a position predicted by a movement of the irradiation position.

According to the position adjusting method of the scanning probe microscope as recited in the above-described Item 10, the irradiation position of the laser beam LA can be identified considering that the laser beam LA is diffusely reflected. Therefore, it is possible to prevent the diffused reflection of the laser beam LA from adversely affecting the processing of the optical axis adjustment of the laser beam in the scanning probe microscope.

DESCRIPTION OF SYMBOLS

1: Scanning probe microscope
10: Cantilever
12: Probe
14: Holder
20: Optical system
22: Laser light source
24: Beam splitter
26: Reflector
28: Detector
30, 40: Drive mechanism
50: Scanner
52: Sample holder
54: Pedestal
60: Imaging unit
100: Control device
120: Processor
140: Memory
160: Display unit
180: Input unit
280: Light-receiving surface
520: Stub-type attachment
522: Mirror
524: Magnet
540: Sample stage
LA: Laser beam
P'': Image
S: Sample

The invention claimed is:

1. A scanning probe microscope comprising:
a cantilever;
a light source configured to emit a laser beam toward the cantilever;
a moving mechanism configured to relatively move an irradiation position of the laser beam on an irradiation surface of the laser beam with respect to the irradiation surface;
an imaging unit with an imaging range in which the cantilever is imaged; and
a control device,
wherein the control device is configured to:
identify a position that diffusely reflects the laser beam, based on an image captured by the imaging unit; and
relatively move the irradiation position with respect to the irradiation surface by the moving mechanism so that the laser beam is emitted to the cantilever by avoiding the position that diffusely reflects the laser beam.

2. The scanning probe microscope as recited in claim 1, wherein the control device identifies the position that diffusely reflects the laser beam, based on an image captured in a state in which the light source is turned off.

3. The scanning probe microscope as recited in claim 1, further comprising:
a mirror provided in a sample holder for holding a sample, wherein the control device identifies the position that diffusely reflects the laser beam within an area corresponding to the mirror in an image captured by the imaging unit.

4. The scanning probe microscope as recited in claim 1, wherein the control device is configured to:
in a case where the laser beam is emitted to the cantilever by relatively moving the irradiation position with respect to the irradiation surface, continuously move the irradiation position with respect to the irradiation surface until the laser beam has become not emitted to the cantilever; and
based on a state of the moving mechanism when the laser beam is emitted to the cantilever and a state of the moving mechanism when the laser beam has become not emitted to the cantilever by continuously moving the irradiation position with respect to the irradiation surface, determine a state of the moving mechanism at a start of an observation.

5. A scanning probe microscope comprising:
a cantilever;
a light source configured to emit a laser beam toward the cantilever;
a moving mechanism configured to relatively move an irradiation position of the laser beam on an irradiation surface of the laser beam with respect to the irradiation surface;
an imaging unit with an imaging range in which the cantilever is imaged; and
a control device,
wherein the control device is configured to:
identify a position of a spot of the laser beam formed on the irradiation surface, based on an image captured by the imaging unit; and
identify the irradiation position depending on whether or not the position of the spot identified based on an image captured by moving the irradiation position by the moving mechanism is a position predicted by a movement of the irradiation position.

6. The scanning probe microscope as recited in claim 5, wherein the moving mechanism moves the irradiation position by moving the light source, and
wherein in a case where the control device moves the irradiation position in a predetermined direction and the position of the spot identified based on the image captured before the irradiation position is moved is not moved in the predetermined direction, the control device determines that the identified position of the spot does not correspond to the irradiation position.

7. The scanning probe microscope as recited in claim 6, wherein in a case where the position of the spot identified based on the image captured before the irradiation position is moved in the predetermined direction, the control device determines that the identified position of the spot corresponds to the irradiation position.

8. The scanning probe microscope as recited in claim 6, wherein the control device is configured to:
in a case where the position of the spot identified based on the image captured before the irradiation position is moved is moved in the predetermined direction, move the irradiation position in the predetermined direction by a predetermined distance, and
in a case where the position of the spot identified based on the image captured by the imaging unit is moved in the predetermined direction in accordance with a movement of the irradiation position, determine that the identified position of the spot corresponds to the irradiation position.

9. An optical axis adjustment method in a scanning probe microscope,
wherein the scanning probe microscope comprises:
a cantilever;
a light source configured to emit a laser beam toward the cantilever;
a moving mechanism configured to relatively move an irradiation position of the laser beam on an irradiation surface of the laser beam with respect to the irradiation surface; and
an imaging unit with an imaging range in which the cantilever is imaged,
wherein the optical axis adjustment method comprises:
a step of identifying a position that diffusely reflects the laser beam, based on an image captured by the imaging unit; and
a step for relatively moving the irradiation position with respect to the irradiation surface so that the laser beam is emitted to the cantilever by avoiding a position that diffusely reflects the laser beam.

10. An optical axis adjustment method in a scanning probe microscope,
wherein the scanning probe microscope comprises:
a cantilever;
a light source configured to emit a laser beam toward the cantilever;
a moving mechanism configured to relatively move an irradiation position of the laser beam on an irradiation surface of the laser beam with respect to the irradiation surface; and
an imaging unit with an imaging range in which the cantilever is imaged,
wherein the optical axis adjustment method comprises:
a step of identifying a position of a spot of the laser beam formed on the irradiation surface based on an image captured by the imaging unit; and
a step of identifying the irradiation position depending on whether or not the position of the spot identified based on the image captured by moving the irradiation position by moving the mechanism is a position predicted by a movement of the irradiation position.

* * * * *